US012761970B2

(12) United States Patent
Nakamura et al.

(10) Patent No.: US 12,761,970 B2
(45) Date of Patent: Oct. 13, 2026

(54) RESOURCE DYNAMIC ALLOCATION DEVICE, RESOURCE DYNAMIC ALLOCATION PROGRAM, RESOURCE DYNAMIC ALLOCATION SYSTEM, AND RESOURCE DYNAMIC ALLOCATION METHOD

(71) Applicant: NTT, Inc., Tokyo (JP)

(72) Inventors: Tetsuro Nakamura, Musashino (JP); Kei Fujimoto, Musashino (JP); Shogo Saito, Musashino (JP)

(73) Assignee: NTT, Inc., Tokyo (JP)

( * ) Notice: Subject to any disclaimer, the term of this patent is extended or adjusted under 35 U.S.C. 154(b) by 395 days.

(21) Appl. No.: 18/572,845

(22) PCT Filed: Jun. 24, 2021

(86) PCT No.: PCT/JP2021/023975

§ 371 (c)(1),
(2) Date: Dec. 21, 2023

(87) PCT Pub. No.: WO2022/269870

PCT Pub. Date: Dec. 29, 2022

(65) Prior Publication Data

US 2024/0296073 A1 Sep. 5, 2024

(51) Int. Cl.
*G06F 9/46* (2006.01)
*G06F 9/50* (2006.01)

(52) U.S. Cl.
CPC .................................. *G06F 9/505* (2013.01)

(58) Field of Classification Search
CPC ...................................................... G06F 9/505
See application file for complete search history.

(56) References Cited

PUBLICATIONS

Kumar et al., “Classification and Workload Balancing of Multi-Threaded Application on Embedded Platform,” In Proceedings of the 2020 IEEE Computer Society Annual Symposium on VLSI (ISVLSI), Jul. 6-8, 2020, Cyprus, 568-573.

Dpdk.org [online], “Wireless Baseband Device Library,” Data Plane Development Kit, available on or before Oct. 2021, retrieved on Jun. 2021, retrieved from URL<https://doc.dpdk.org/guides-20.11/prog_guide/bbdev.html>, 25 pages.

*Primary Examiner* — Gregory A Kessler
(74) *Attorney, Agent, or Firm* — Fish & Richardson P.C.

(57) ABSTRACT

A resource dynamic allocation device includes: a unit thread ID acquisitor that acquires identification information of an application process initialized at a time of activation, identification information of a thread which is included in the application process and to which a possible physical resource on a physical server is allocated, and identification information of the physical resource allocated to the thread; and a resource recorder/allocator that freezes all threads of the initialized application process and freezes the thread or unfreezes the thread in accordance with any one of transfer traffic, a resource load, and a load of the application process.

9 Claims, 14 Drawing Sheets

Fig. 6

32

| APPLICATION ID | TRANSFER LOOP | THREAD ID | PHYSICAL CPU CORE | ACC PHYSICAL QUEUE |
|---|---|---|---|---|
| 1 | 1A | 1001 | 0 | 0 |
| 1 | 1A | 1002 | 1 | 1 |
| 1 | 1B | 1003 | 2 | 2 |
| 2 | 2A | 2001 | 0 | 0 |
| 2 | 2B | 2002 | 1 | 1 |
| : | : | : | : | : |

Fig. 7

35

| THREAD ID | FREEZING |
|---|---|
| 1001 | True |
| 1002 | True |
| 1003 | False |
| : | : |

RESOURCE DYNAMIC ALLOCATION DEVICE, RESOURCE DYNAMIC ALLOCATION PROGRAM, RESOURCE DYNAMIC ALLOCATION SYSTEM, AND RESOURCE DYNAMIC ALLOCATION METHOD

CROSS-REFERENCE TO RELATED APPLICATIONS

This application is a National Stage application under 35 U.S.C. § 371 of International Application No. PCT/JP2021/023975, having an International Filing Date of Jun. 24, 2021, the disclosure of which is considered part of the disclosure of this application, and is incorporated by reference in its entirety into this application.

TECHNICAL FIELD

The present invention relates to a resource dynamic allocation device, a resource dynamic allocation program, a resource dynamic allocation system, and a resource dynamic allocation method.

BACKGROUND ART

In recent years, there have been used accelerators in which a plurality of convolutional neural networks for inference is mounted in units of intellectual property cores (IP cores). Such accelerators can be used in a plurality of use cases.

The accelerator has a plurality of send queues for sending data to a central processing unit (CPU) or a plurality of receive queues for receiving data from the CPU. The accelerator processes the data of each receive queue independently in parallel and returns the data to the corresponding send queue. Then, a CPU core that executes a thread forming an application process performs polling transmission and polling reception of data with respect to the accelerator.

An existing application that transfers data to an accelerator in a poll mode, such as a data plane development kit (DPDK), writes in detail how to use a network interface card (NIC) logical queue, a logical CPU core, and an accelerator (ACC) logical queue in the application and operates by associating the NIC logical queue, the logical CPU core, and the ACC logical queue with physical resources at the time of initialization when the application is started.

For example, the above premise corresponds to a case where a network application such as a virtualized radio access network (vRAN) is accelerated by DPDK and a field-programmable gate array (FPGA).

CITATION LIST

Non Patent Literature

Non Patent Literature 1: "Data Plane Development Kit (DPDK), 16. Wireless Baseband Device Library", [online], [retrieved on Jun. 18, 2021], the Internet <URL: https://doc.dpdk.org/guides/prog_guide/bbdev.html>

SUMMARY OF INVENTION

Technical Problem

When an application process uses physical resources such as accelerators, the following two problems arise.

The first problem is efficiency. When the physical resources are allocated to the application process at the time of initialization, the allocated physical resources become under control of the application process. Physical resources allocated to a certain application process are not allocated to another application process until the entire application process is stopped in view of performance and security. That is, in order to reuse the physical resources, it is necessary to stop all threads including processing in operation. That is, in a case where the physical resources are not used although the physical resources are allocated to the application process, operation efficiency of the physical resources is reduced.

The second problem is versatility. The first problem can be solved by supporting dynamic resource connection and isolation with application programs not only at the time of initialization but also in operation. However, it is necessary to greatly change logics of all the application programs. Therefore, it is desirable to separate unused physical resources from an application process of an existing application program without stopping the application process and reallocate the unused physical resources to another application process, while following a logic of the existing application program in order to have versatility. In order to achieve this, it is desirable to achieve efficiency by adapting a platform, without modifying the logic of the existing application process in which how to use the CPU core and queues are written.

Therefore, an object of the present invention is to maximize resource efficiency by dynamically using physical resources mounted on a physical server for each application.

Solution to Problem

In order to solve the above problems, a resource dynamic allocation device according to the present invention includes: a thread ID acquisitor that acquires identification information of an application process initialized at a time of activation, identification information of a thread which is included in the application process and to which a possible physical resource on a physical server is allocated, and identification information of the physical resource allocated to the thread; and a resource recorder/allocator that freezes all threads of the initialized application process and freezes the thread or unfreezes the thread in accordance with any one of transfer traffic, a resource load, and a load of the application process.

Other means will be described in Description of Embodiments.

Advantageous Effects of Invention

The present invention can maximize resource efficiency by dynamically using physical resources mounted on a physical server for each application.

BRIEF DESCRIPTION OF DRAWINGS

FIG. 6 illustrates a thread information table.

FIG. 7 illustrates a thread state table.

DESCRIPTION OF EMBODIMENTS

Hereinafter, an embodiment for implementing the present invention will be described in detail with reference to the drawings.

Figure 1:
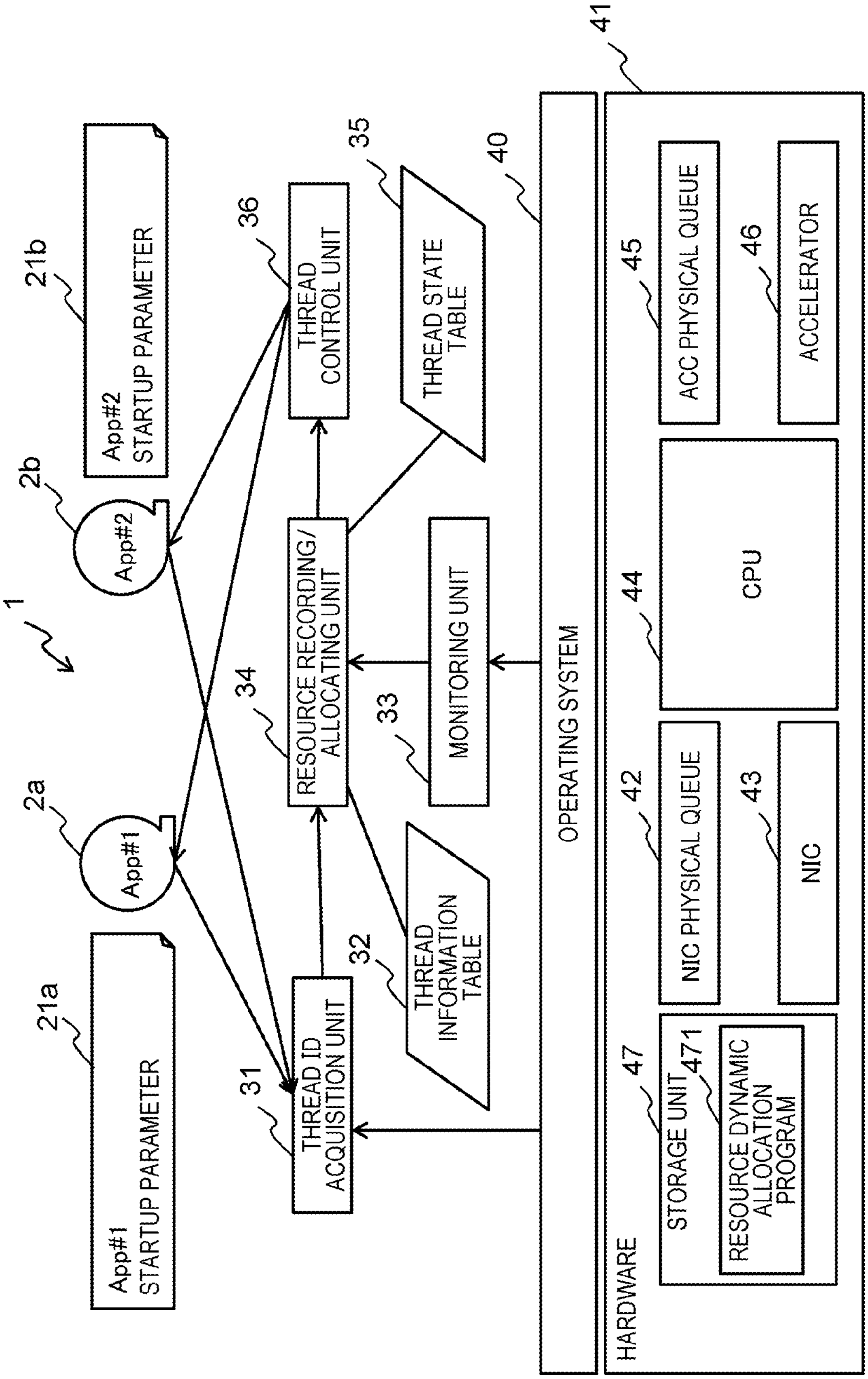
FIG. 1 is a configuration diagram of a resource dynamic allocation device according to the present embodiment.

FIG. 1 is a configuration diagram of a resource dynamic allocation device 1 according to the present embodiment.

The resource dynamic allocation device 1 includes a thread ID acquisitor 31, a thread controller 36, a resource recorder/allocator 34, and a monitor 33. Those functional units are embodied on the same physical server.

The resource dynamic allocation device 1 is a computer further including an operating system 40 and hardware 41. The operating system 40 may be simply referred to as “OS”. The hardware 41 includes an NIC physical queue 42, an NIC 43, a CPU 44, an ACC physical queue 45, an accelerator 46, and a storage 47. The storage 47 stores a resource dynamic allocation program 471. When the CPU 44 executes the resource dynamic allocation program 471, the functional units of the thread ID acquisitor 31, the thread controller 36, the resource recorder/allocator 34, and the monitor 33 are embodied.

All possible physical resources on the physical server included in the resource dynamic allocation device 1 are allocated to both applications 2*a* and 2*b* at the time of activation. Here, the physical resources are, for example, physical CPU cores included in the CPU 44, the NIC physical queue 42, the NIC 43, the ACC physical queue 45, and the accelerator 46 of the hardware 41. In a case where the physical resources are allocated to a plurality of applications, the physical resources are exclusively used by each application in time division.

The CPU 44 includes the plurality of physical CPU cores. The NIC 43 includes a plurality of ports. The NIC physical queue 42 includes a plurality of physical queues. The physical queues are roughly divided into a send queue and a receive queue. Data stored in the send queue is sent to the outside of the resource dynamic allocation device 1 by using any of the ports of the NIC 43. Data extracted from the receive queue is received from the outside by using any of the ports of the NIC 43.

The accelerator 46 includes a plurality of accelerator cores. The ACC physical queue 45 includes a plurality of physical queues. The physical queues are roughly divided into a send queue and a receive queue. Data put into the send queue is processed by the accelerator cores and is then stored in the receive queue. Data extracted from the receive queue by the physical CPU cores is processed by any of the accelerator cores.

When the application is initialized, the thread ID acquisitor 31 acquires each thread ID of the application, a correspondence relationship between the logical CPU core and the physical CPU core, a correspondence relationship between an ACC logical queue and the ACC physical queue 45, and a correspondence relationship between an NIC logical queue and the NIC physical queue 42 and stores the thread ID and the correspondence relationships in a thread information table 32.

The monitor 33 monitors transfer traffic, a resource load (e.g. queue usage rate), and a load of the application. The monitor 33 compares the loads with thresholds and notifies the resource recorder/allocator 34 of scale-out or scale-in of the application as necessary.

After the application is initialized, the resource recorder/allocator 34 sends the thread IDs of the application to the thread controller 36 and freezes all threads of the application. The resource recorder/allocator 34 freezes the threads when the scale-out notification is issued from the monitor 33 and unfreezes the threads when the scale-in notification is issued therefrom.

The resource recorder/allocator 34 holds a frozen state of the threads in a thread state table 35. By referring to both the thread state table 35 and the thread information table 32, the resource recorder/allocator 34 controls the physical resources allocated to the application such that the application and another application do not simultaneously access the physical resources.

The resource recorder/allocator 34 holds the frozen state of each thread and performs freeze control such that the applications do not simultaneously access the same resource, thereby achieving dynamic resource allocation.

The thread controller 36 has an interface compatible with an existing application. The thread controller 36 achieves dynamic resource allocation by freezing and unfreezing each thread from the outside, without changing a logic of the existing application.

Figure 2:
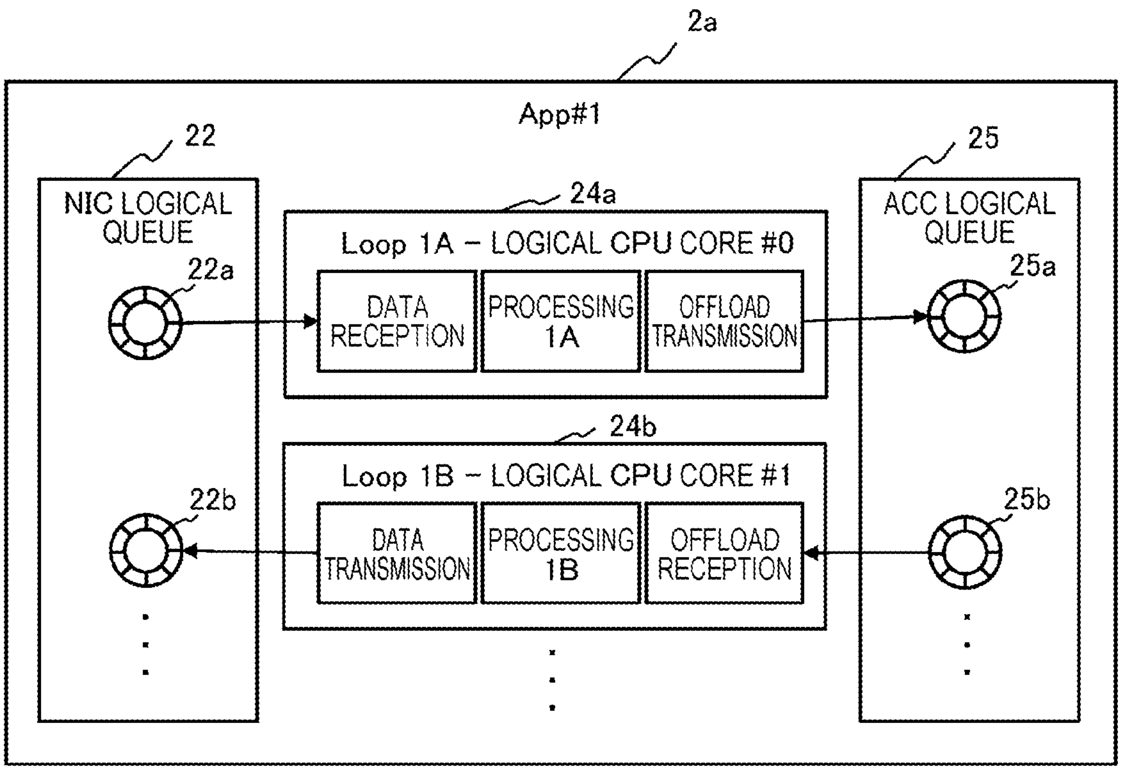
FIG. 2 illustrates an operation example of an application #1.

FIG. 2 illustrates an operation example of the application 2*a* (App #1).

The existing application 2*a* that transfers data to the accelerator 46 in a poll mode, such as DPDK, embodies an NIC logical queue 22, logical CPU cores 24*a*, 24*b*, . . . , and an ACC logical queue 25 therein.

The logical CPU core 24*a* to which the number #0 is given performs data reception processing of an NIC logical queue 22*a* to which the number #0 is given and also performs offload transmission to an ACC logical queue 25*a*. A series of the above processing will be referred to as transfer loop processing 1A. By the transfer loop processing 1A, content of the NIC logical queue 22*a* is transferred to the ACC logical queue 25*a*, and the accelerator core associated with the ACC logical queue 25*a* can process the content of the ACC logical queue 25*a*.

The logical CPU core 24*b* to which the number #1 is given performs offload reception processing of an ACC logical queue 25*b* to which the number #1 is given and performs data transmission to an NIC logical queue 22*b*. A series of the above processing will be referred to as transfer loop processing 1B. By the transfer loop processing 1B, content output from the accelerator core to the ACC logical queue 25*b* is transferred to the NIC logical queue 22*b*.

Figure 3:
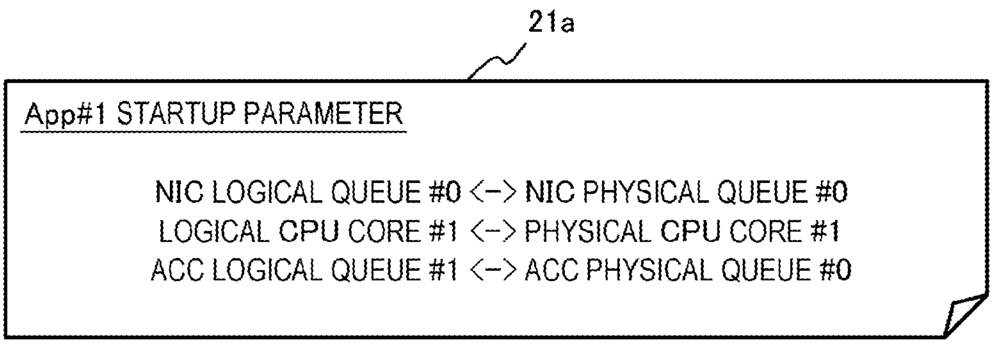
FIG. 3 illustrates a startup parameter of the application #1.

FIG. 3 illustrates a startup parameter 21*a* of the application #1.

The startup parameter 21*a* stores correspondence between the NIC logical queue and the NIC physical queue, correspondence between the logical CPU core and the physical CPU core, and correspondence between the ACC logical queue and the ACC physical queue. Specifically, the NIC logical queue #0 is associated with the NIC physical queue #0. The logical CPU core #1 is associated with the physical CPU core #1. The ACC logical queue #1 is associated with the ACC physical queue #0.

As described above, a setting of the application 2*a* at the time of start is written in detail in the startup parameter 21*a*, and each logical resource of the application 2*a* is associated with a physical resource at the time of initialization when the application 2*a* is started.

When physical resources required at the time of initialization of the application are allocated, the allocated physical resources become under control of the application. The physical resources are not allocated to another application until the entire application process is stopped in view of performance and security. That is, in order to reuse the physical resources, it is necessary to stop all threads to which the physical resources are allocated, including processing in operation.

In a case where the physical resources are not used although the physical resources are allocated to the application, operation efficiency of the physical resources (e.g. accelerators) is reduced. Here, the above first problem can be solved by supporting dynamic resource connection and isolation with the application not only at the time of initialization but also online. However, it is necessary to greatly change logics of all applications.

Figure 4:
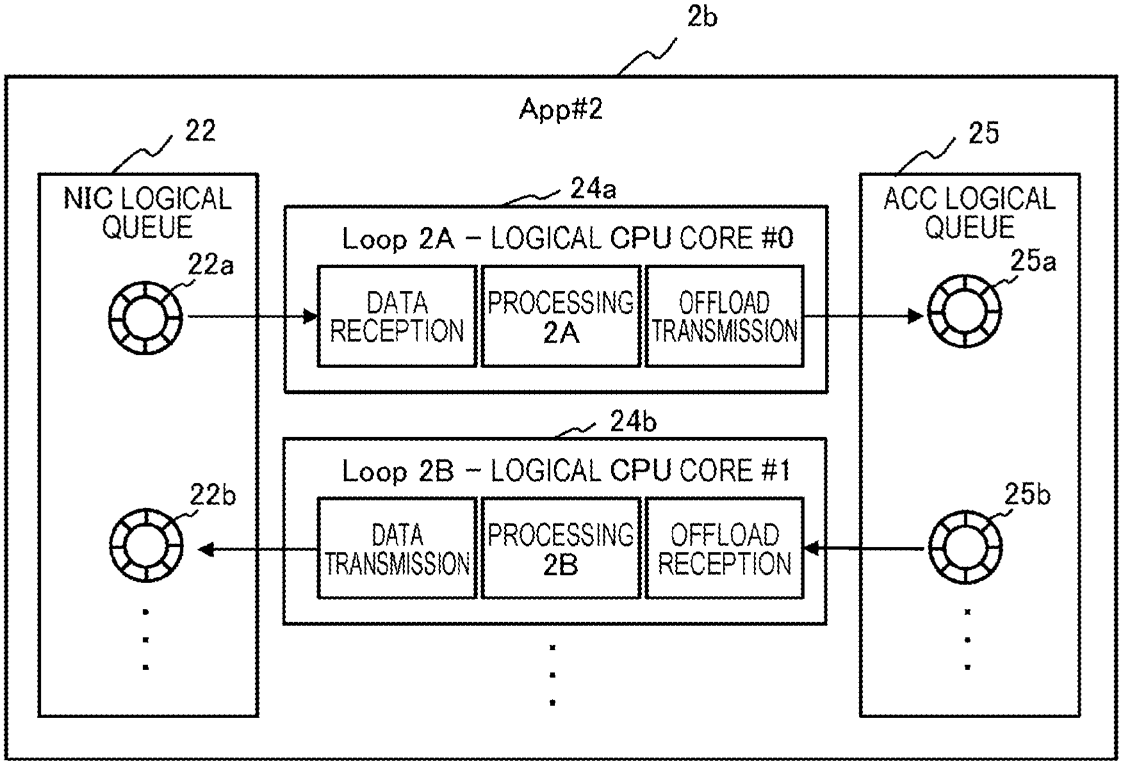
FIG. 4 illustrates an operation example of an application #2.

FIG. 4 illustrates an operation example of the application 2*b* (App #2).

The application 2*b* embodies the NIC logical queue 22, the logical CPU cores 24*a*, 24*b*, . . . , and the ACC logical queue 25 therein.

The logical CPU core 24*a* to which the number #0 is given performs data reception processing of the NIC logical queue 22*a* to which the number #0 is given and also performs offload transmission to the ACC logical queue 25*a*. A series of the above processing will be referred to as transfer loop processing 2A. By the transfer loop processing 2A, the content of the NIC logical queue 22*a* is transferred to the ACC logical queue 25*a*, and the accelerator core associated with the ACC logical queue 25*a* can process the content of the ACC logical queue 25*a*.

The logical CPU core 24*b* to which the number #1 is given performs offload reception processing of the ACC logical queue 25*b* to which the number #1 is given and performs data transmission to the NIC logical queue 22*b*. The above transfer loop processing is processing 2B. By the transfer loop processing 2B, the content output from the accelerator core to the ACC logical queue 25*b* is transferred to the NIC logical queue 22*b*.

Figure 5:
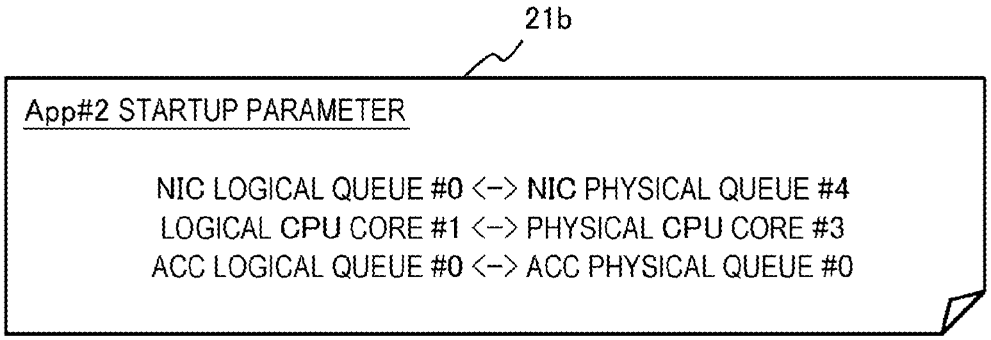
FIG. 5 illustrates a startup parameter of the application #2.

FIG. 5 illustrates a startup parameter 21*b* of the application #2.

The startup parameter 21*b* stores correspondence between the NIC logical queue and the NIC physical queue, correspondence between the logical CPU core and the physical CPU core, and correspondence between the ACC logical queue and the ACC physical queue. Specifically, the NIC logical queue #0 is associated with an NIC physical queue #4. The logical CPU core #1 is associated with a physical CPU core #3. The ACC logical queue #1 is associated with the ACC physical queue #0.

FIG. 6 illustrates the thread information table 32.

The thread information table 32 includes an application ID field, a transfer loop field, a thread ID field, a physical CPU core field, and an ACC physical queue field. Each row of the thread information table 32 corresponds to each thread included in the application.

The application ID field stores an identification number of the application.

The transfer loop field stores identification information of the transfer loop processing.

The thread ID field stores an identifier of the thread included in the application.

The physical CPU core field stores an identifier of a physical CPU allocated to the thread.

The ACC physical queue field stores an identifier of an ACC physical queue allocated to the thread.

FIG. 7 illustrates the thread state table 35.

The thread state table 35 includes a thread ID field and a freezing field. Each row of the thread state table 35 corresponds to each thread included in the application.

The thread ID field stores an identifier of the thread included in the application.

The freezing field stores whether or not the thread is frozen.

Figure 8:
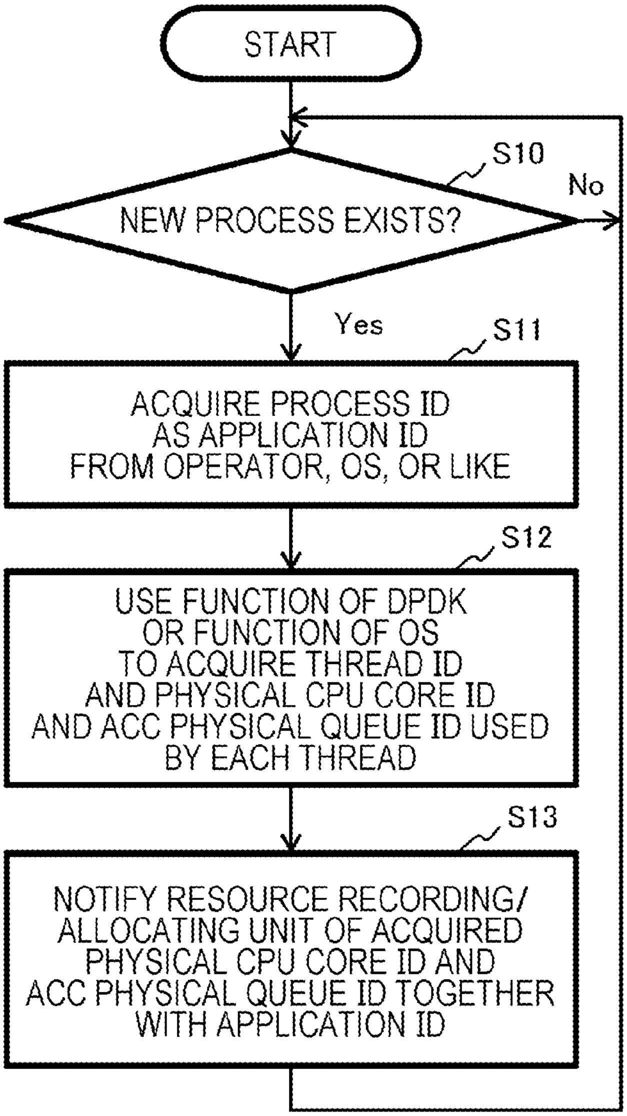
FIG. 8 is a flowchart of thread ID acquisition processing.

FIG. 8 is a flowchart of thread ID acquisition processing.

In the thread ID acquisition processing, the thread ID acquisitor 31 always determines whether or not a new process exists (S10). The thread ID acquisitor 31 proceeds to step S11 when a new process exists (Yes) and repeats the processing in step S10 when no new process exists.

In step S11, the thread ID acquisitor 31 acquires a process ID as an application ID from an operator, the operating system 40, or the like. Then, the thread ID acquisitor 31 uses the function of DPDK or the function of the operating system 40 to acquire a thread ID and a physical CPU core ID and ACC physical queue ID used by each thread (step S12). When the thread ID acquisitor 31 notifies the resource recorder/allocator 34 of the acquired physical CPU core ID and ACC physical queue ID together with the application ID (step S13), the processing returns to step S10.

Figure 9:
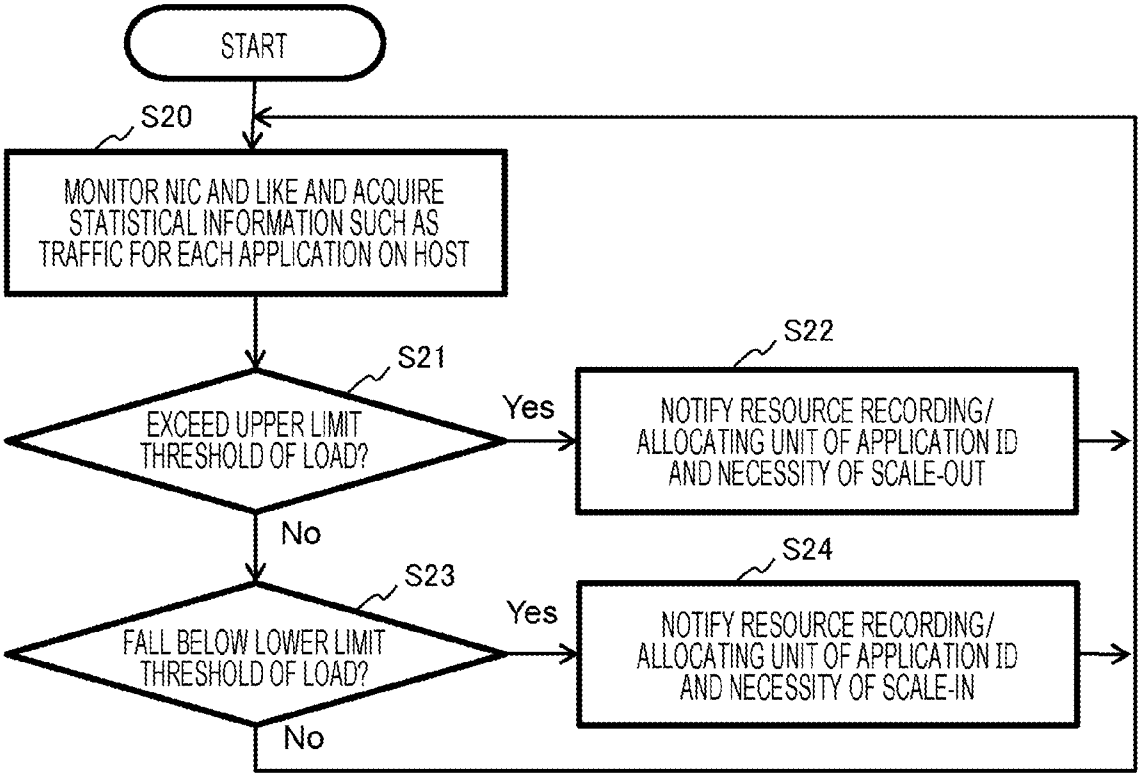
FIG. 9 is a flowchart of monitoring processing.

FIG. 9 is a flowchart of monitoring processing.

In the monitoring processing, the monitor 33 always monitors the NIC 43 and the like and acquires statistical information such as traffic for each application on the physical server (S20). Then, the monitor 33 determines whether or not a load of the application exceeds an upper limit threshold (S21). When the load of the application exceeds the upper limit threshold (Yes), the monitor 33 notifies the resource recorder/allocator 34 of the application ID and the necessity of scale-out of the application (step S22), and the processing returns to step S20.

When the load of the application does not exceed the upper limit threshold (No), the monitor 33 proceeds to step S23. When the load of the application falls below a lower limit threshold (Yes) in step S23, the monitor 33 notifies the resource recorder/allocator 34 of the application ID and the necessity of scale-in of the application (step S24), and the processing returns to step S20. When the load of the application does not fall below the lower limit threshold (No) in step S23, the monitor 33 returns to the processing of step S20.

Figure 10:
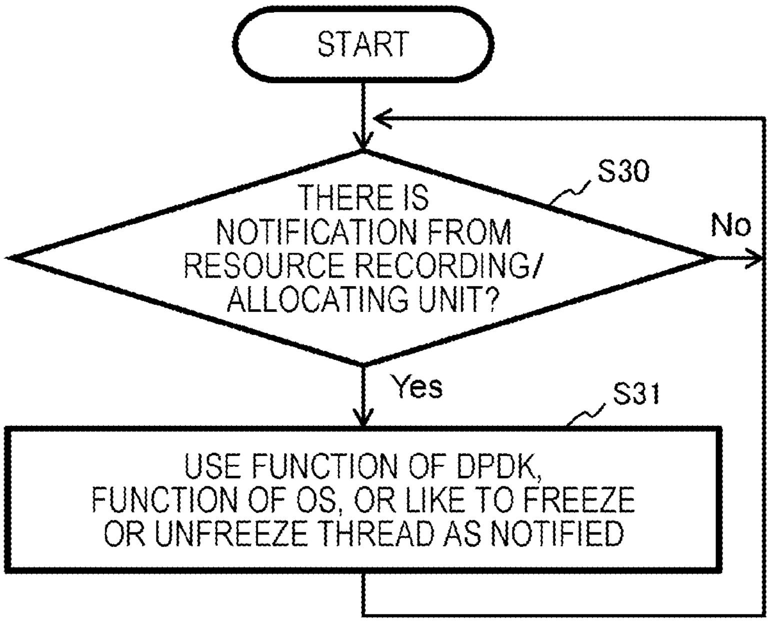
FIG. 10 is a flowchart of thread control processing.

FIG. 10 is a flowchart of thread control processing.

In the thread control processing, the thread controller 36 determines whether or not there is a notification of freezing or unfreezing a thread from the resource recorder/allocator 34 (S30). When there is a notification from the resource recorder/allocator 34 (Yes), the thread controller 36 uses the function of DPDK, the function of the operating system 40, or the like to freeze or unfreeze the thread as in the notification from the resource recorder/allocator 34 (S31) and then returns to the processing of step S30.

When there is no notification from the resource recorder/allocator 34 (No), the thread controller 36 returns to the processing in step S30.

Figure 11:
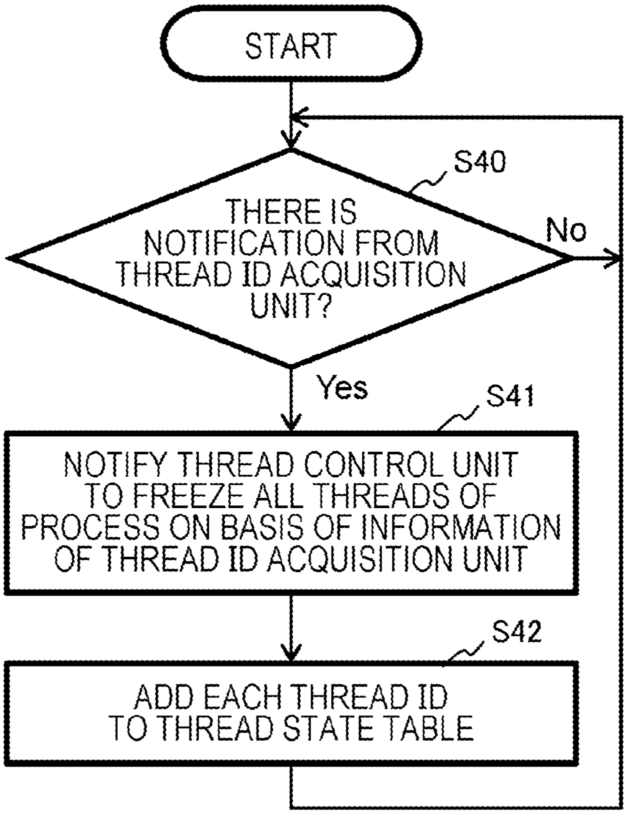
FIG. 11 is a flowchart of thread freezing processing.

FIG. 11 is a flowchart of thread freezing processing.

In the thread freezing processing, the resource recorder/allocator 34 determines whether or not there is a notification that an application process has been activated from the thread ID acquisitor 31 (S40). When there is a notification from the thread ID acquisitor 31 (Yes) in step S40, the resource recorder/allocator 34 proceeds to step S41, whereas, when there is no notification (No), the resource recorder/allocator returns to step S40.

In step S41, the resource recorder/allocator 34 notifies the thread controller 36 to freeze all threads of the application process on the basis of information of the thread ID acquisitor 31. Next, the resource recorder/allocator 34 adds each thread ID to the thread state table 35 and then returns to the processing in step S40.

Figure 12:
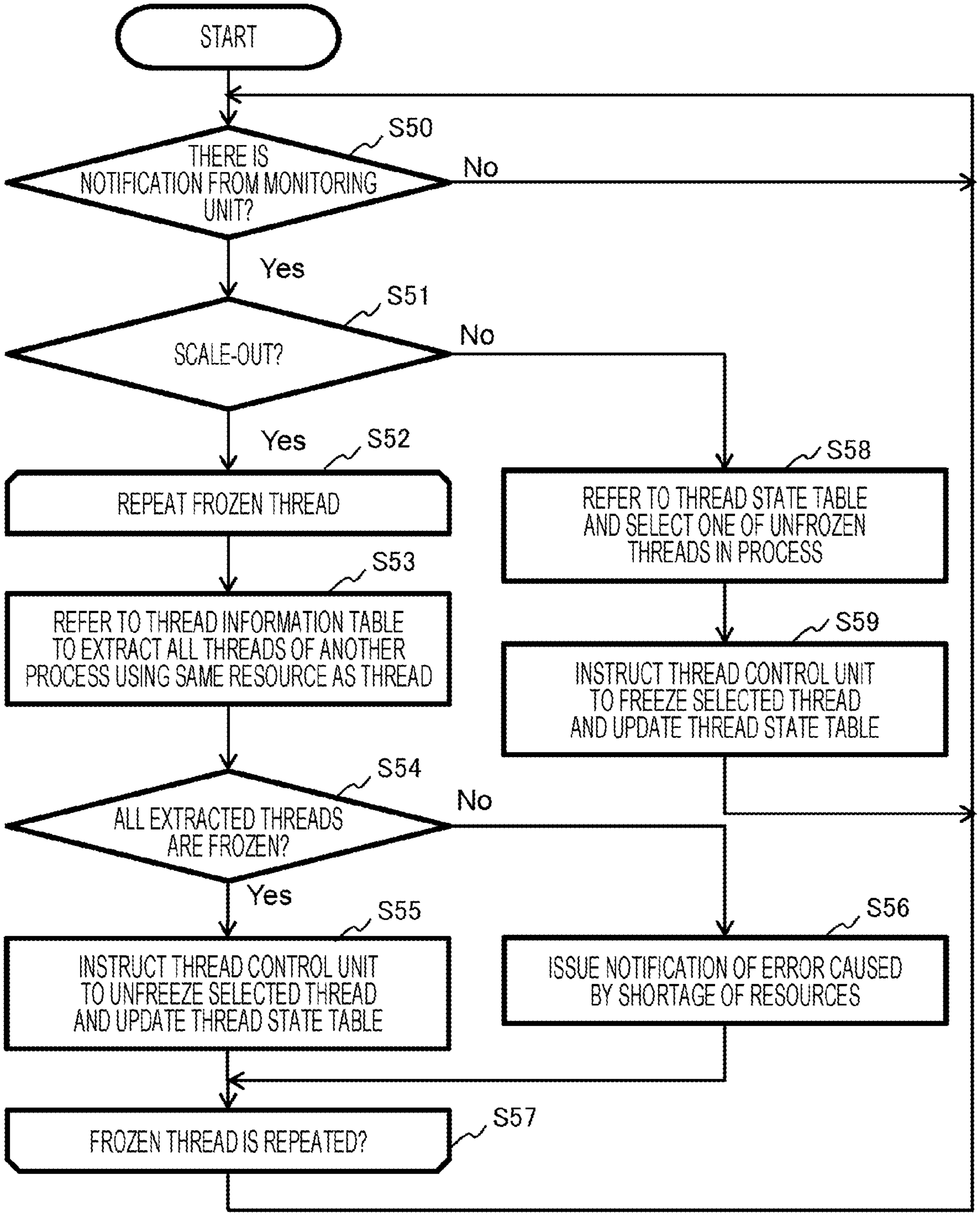
FIG. 12 is a flowchart of scale-out/scale-in processing.

FIG. 12 is a flowchart of scale-out/scale-in processing. The scale-out/scale-in processing is performed in parallel with the thread freezing processing.

In the scale-out/scale-in processing, the resource recorder/allocator 34 determines whether or not there is a notification from the monitor 33 (S50). Then, the resource recorder/allocator 34 determines whether or not the notification from the monitor 33 is scale-out (S51). When the notification from the monitor 33 is scale-out (Yes), the resource recorder/allocator 34 proceeds to step S52, whereas, when the notification from the monitor 33 is scale-in (No), the resource recorder/allocator proceeds to step S58.

<<Scale-Out Processing>>

In step S52, the resource recorder/allocator 34 repeats the processing in steps S53 to S56 for a frozen thread regarding an issued process ID.

The resource recorder/allocator 34 refers to the thread information table to extract all threads of another process using the same resource as the thread (step S53). Then, the resource recorder/allocator 34 determines whether or not all the threads extracted in step S53 are frozen (S54).

When all the threads extracted in step S53 are frozen (Yes) in step S54, the resource recorder/allocator 34 proceeds to step S55, instructs the thread controller 36 to unfreeze the selected thread and updates the thread state table 32. When any of the extracted threads is not frozen (No), the resource recorder/allocator 34 proceeds to step S56 and issues a notification of an error caused by shortage of resources.

When the resource recorder/allocator 34 terminates the processing of the frozen thread regarding the issued process ID in step S57, the resource recorder/allocator returns to the processing in step S50.

<<Scale-In Processing>>

In step S58, the resource recorder/allocator 34 refers to the thread state table and selects any one of the unfrozen threads in the process. Then, when the resource recorder/allocator 34 instructs the thread controller 36 to freeze the selected thread, updates the thread state table 35 (step S59), and then returns to the processing in step S50.

According to the present embodiment, when a plurality of network applications in which packet transfer is speeded up by using the accelerators, such as vRAN, is mounted on the same server, it is possible to dynamically allocate and isolate physical resources including the accelerators by adapting a platform, without modifying the existing application logic.

This makes it possible to dynamically adjust to which application process the physical resources are allocated in accordance with an actual load. Therefore, it is possible to prevent over-provisioning to one application process and continue a service with fewer physical resources.

It is further possible to reduce power consumption by freezing an unused CPU thread.

When the technique of the present invention is used, accelerators can be shared. For example, four accelerators are prepared for three applications, and one accelerator is basically allocated to a process of each application at a ratio of 1:1 such that each process occupies one accelerator. Then, one spare accelerator is redundantly allocated to the processes of the respective applications and is shared by the processes. This makes it possible to switch the accelerator to the spare accelerator, without stopping the process. That is, it is possible to use the current shared technique for the redundancy of the accelerators.

Further, in a case where a thread is frozen, the thread can be frozen after, for example, processing is taken over to another thread operating in the same process.

First Modification Example

In the above embodiment, each function operates in the same physical server. Meanwhile, a first modification example is a resource dynamic allocation system that controls scale-in and scale-out of physical resources in cooperation with an external controller 5 on the basis of information of a plurality of physical servers 4*a* and 4*b*.

Figure 13:
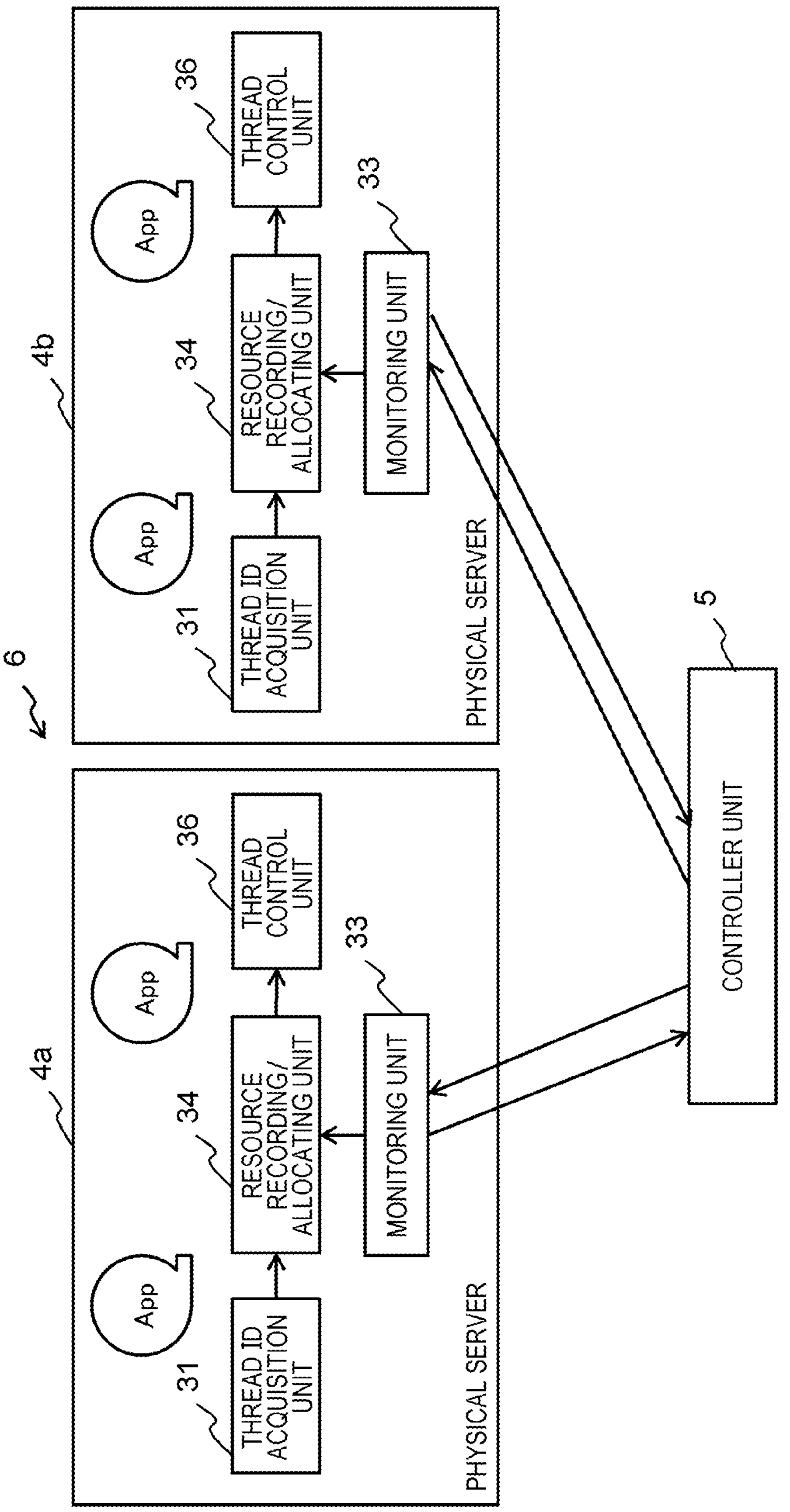
FIG. 13 is an explanatory diagram of external controller cooperation at the time of resource control.

FIG. 13 is an explanatory diagram of external controller cooperation at the time of resource control.

A resource dynamic allocation system 6 of the first modification example includes the plurality of physical servers 4*a* and 4*b* and the external controller 5.

The physical servers 4*a* and 4*b* are resource dynamic allocation devices each including a thread ID acquisitor 31, a thread controller 36, a resource recorder/allocator 34, and a monitor 33. The monitor 33 of the physical server 4*a* not only determines scale-in/scale-out of resources by itself on the basis of a load of an application and traffic on the own physical server 4*a*, but also continuously notifies the external controller 5 of statistical information. The monitor 33 of the physical server 4*b* not only determines scale-in/scale-out of resources by itself on the basis of a load of an application and traffic on the own physical server 4*b*, but also continuously notifies the external controller 5 of statistical information.

As described above, it is also possible to leave the determination of the scale-in/scale-out of resources to the external controller 5.

The resource dynamic allocation system 6 of the first modification example can comprehensively determine the necessity of scaling the resources on the basis of an application-specific value (e.g. weather or a time period in a day in a case of RAN) together with the statistical information (e.g. traffic) from each of the physical servers 4*a* and 4*b*.

Second Modification Example

Figure 14:
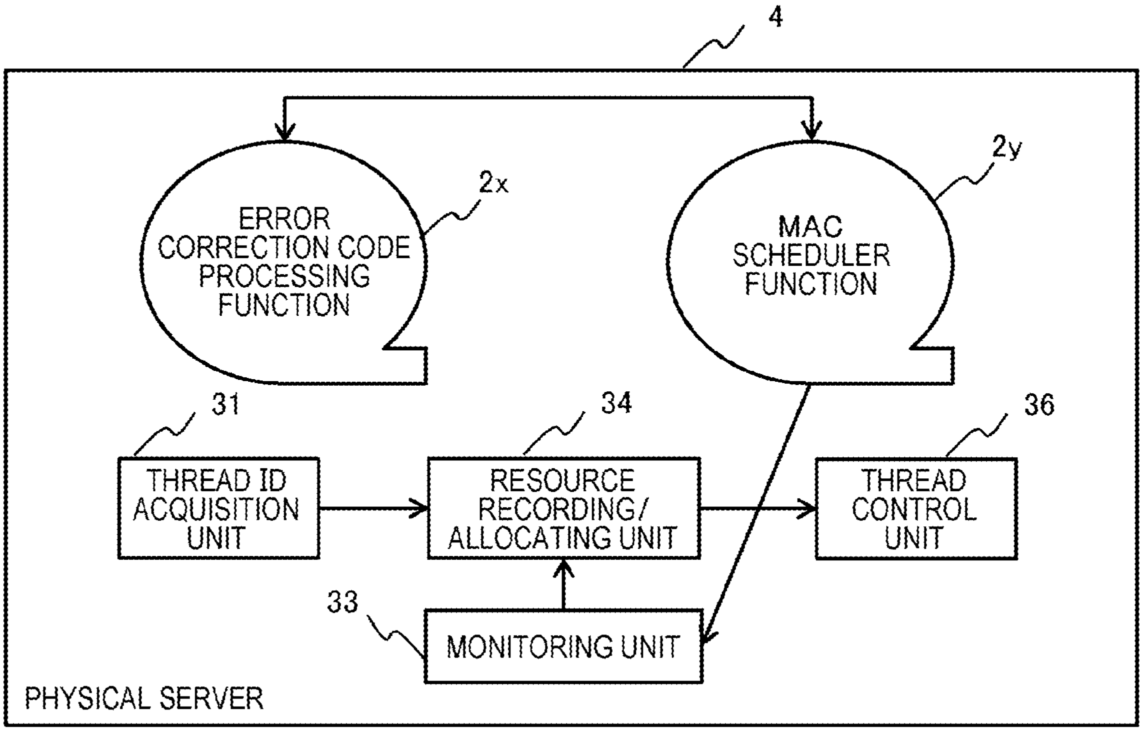
FIG. 14 is an explanatory diagram of cooperation with another application.

FIG. 14 is an explanatory diagram of cooperation with another application.

An error correction code processing function 2*x* operates in cooperation with a media access control (MAC) scheduler function 2*y*. The MAC scheduler function 2*y* operates in cooperation with a monitor 33.

The monitor 33 determines scale-in and scale-out of physical resources on the basis of not only information obtained from an operating system 40 or an external controller but also information from the MAC scheduler function 2*y* that is a related application. This makes it possible to suitably determine scale-in and scale-out of the physical resources.

Effects

Hereinafter, effects of the resource dynamic allocation device and the like according to the present invention will be described.

<<Claim 1>>

A resource dynamic allocation device including:

a thread ID acquisitor that acquires an application process initialized at a time of activation, a thread which is included in the application process and to which a possible physical resource on a physical server is allocated, and allocation information of the physical resource allocated to the thread and records the application process, the thread, and the allocation information in a thread information table; and a resource recorder/allocator that freezes all threads of the initialized application process and freezes the thread or unfreezes the thread in accordance with any one of transfer traffic, a resource load, and a load of the application process.

The resource recorder/allocator determines whether to freeze the thread or unfreeze the thread in accordance with any one of the transfer traffic, the resource load, and the load of the application process. Therefore, the physical resource mounted on the physical server can be dynamically used for each application in time division, which makes it possible to maximize resource efficiency.

<<Claim 2>>

The resource dynamic allocation device according to claim 1, in which the resource recorder/allocator holds frozen states of the threads in a thread state table, and unfreezes the frozen thread in a case where the resource recorder/allocator determines that all other threads using the physical resource allocated to the frozen thread are frozen by referring to the thread information table and the thread state table.

Therefore, it is possible to perform control such that a plurality of applications does not simultaneously access the same physical resource.

<<Claim 3>>

The resource dynamic allocation device according to claim 2, further including a monitor that notifies the resource recorder/allocator of scale-out of the application process when the load of the application process exceeds an upper limit threshold, in which the resource recorder/allocator determines whether or not the frozen thread included in the application process whose scale-out notification has been issued by the monitor can be unfrozen.

Therefore, it is possible to dynamically unfreeze the thread by detecting scale-out of the application process.

<<Claim 4>>

The resource dynamic allocation device according to claim 3, in which:

the monitor notifies the resource recorder/allocator of scale-in of the application process when the load of the application process falls below a lower limit threshold; and the resource recorder/allocator selects and freezes any one of the unfrozen threads included in the application process whose scale-in notification has been issued by the monitor.

Therefore, it is possible to dynamically freeze the unfrozen thread by detecting scale-in of the application process.

<<Claim 5>>

The resource dynamic allocation device according to claim 1, in which a same physical resource is allowed to be redundantly allocated to different threads of the application process.

Therefore, for example, it is possible to allocate a single physical resource for a plurality of application processes as a spare physical resource.

<<Claim 6>>

A resource dynamic allocation program causing a computer to execute:

a procedure of acquiring an application process initialized at a time of activation, a thread which is included in the application process and to which a possible physical resource on a physical server is allocated, and allocation information of the physical resource allocated to the thread; and a procedure of freezing all threads of the initialized application process and freezing the thread or unfreezing the thread in accordance with any one of transfer traffic, a resource load, and a load of the application process.

Therefore, the physical resource mounted on the physical server can be dynamically used for each application in time division, which makes it possible to maximize resource efficiency.

<<Claim 7>>

A resource dynamic allocation system including:

a plurality of resource dynamic allocation devices that dynamically allocates a resource; and a controller that determines scale-in and scale-out of the resource, in which the resource dynamic allocation device includes a thread ID acquisitor that acquires an application process initialized at a time of activation, a thread which is included in the application process and to which a possible physical resource on a physical server is allocated, and allocation information of the physical resource allocated to the thread and records the application process, the thread, and the allocation information in a thread information table, and a resource recorder/allocator that freezes all threads of the initialized application process and freezes the thread or unfreezes the thread in accordance with any one of transfer traffic, a resource load, and a load of the application process.

Therefore, it is possible to maximize the resource efficiency by dynamically using physical resources mounted on a physical server for each application. Further, because scale-in and scale-out are determined by the external controller, it is possible to suitably determine whether to freeze or unfreeze each process.

<<Claim 8>>

A resource dynamic allocation method including:

a step of a thread ID acquisitor acquiring an application process initialized at a time of activation, a thread which is included in the application process and to which a possible physical resource on a physical server is allocated, and allocation information of the physical resource allocated to the thread and recording the application process, the thread, and the allocation information in a thread information table; and a step of freezing all threads of the initialized application process and freezing the thread or unfreezing the thread in accordance with any one of transfer traffic, a resource load, and a load of the application process.

All the threads of the initialized application process are frozen, and the thread is frozen or unfrozen in accordance with any one of the transfer traffic, the resource load, and the load of the application process. Therefore, it is possible to maximize the resource efficiency by dynamically using physical resources mounted on a physical server for each application.

REFERENCE SIGNS LIST

1 Resource dynamic allocation device
2*a*, 2*b* Application
2*x* Error correction code processing function
2*y* MAC scheduler function
21*a*, 21*b* Startup parameter
22 NIC logical queue
22*a*, 22*b* NIC logical queue
24*a*, 24*b* Logical CPU core
25, 25*a*, 25*b* ACC logical queue
30 Initializer
31 Thread ID acquisitor
32 Thread information table
33 Monitor
34 Resource recorder/allocator
35 Thread state table
36 Thread controller
4*a*, 4*b* Physical server (Resource dynamic allocation device)
40 Operating system
41 Hardware
42 NIC physical queue
43 NIC
44 CPU
45 ACC physical queue
46 Accelerator
47 Storage
471 Resource dynamic allocation program
5 Controller

The invention claimed is:

1. A resource dynamic allocation device comprising:
a processor; and
a memory storing instructions that, when executed by the processor, cause the resource dynamic allocation device to function as:
a thread ID acquisitor that acquires identification information of a multithreaded application process initialized at a time of activation, identification information of a thread which is included in the multithreaded application process and to which a possible physical resource on a physical server is allocated, and identification information of the physical resource allocated to the thread; and
a resource recorder/allocator that freezes the thread or unfreezes the thread in accordance with any one of transfer traffic, a resource load, and a load of the multithreaded application process.

2. The resource dynamic allocation device according to claim 1, wherein the resource recorder/allocator records the identification information of the multithreaded application process, the identification information of the thread, and the identification information of the physical resource received from the thread ID acquisitor in a thread information table, holds frozen states of the threads in a thread state table, and unfreezes the frozen thread in a case where the resource recorder/allocator determines that all other threads using the physical resource allocated to the frozen thread are frozen by referring to the thread information table and the thread state table.

3. The resource dynamic allocation device according to claim 2, further comprising a monitor that notifies the resource recorder/allocator of scale-out of the application process when the load of the multithreaded application process exceeds an upper limit threshold, wherein
the resource recorder/allocator determines whether or not the frozen thread included in the multithreaded application process whose scale-out notification has been issued by the monitor can be unfrozen.

4. The resource dynamic allocation device according to claim 3,
wherein:
the monitor notifies the resource recorder/allocator of scale-in of the multithreaded application process when the load of the multithreaded application process falls below a lower limit threshold; and
the resource recorder/allocator selects and freezes any one of the unfrozen threads included in the multithreaded application process whose scale-in notification has been issued by the monitor.

5. The resource dynamic allocation device according to claim 1,
wherein
a same physical resource is allowed to be redundantly allocated to different threads of the multithreaded application process.

6. A non-transitory computer-readable storage medium storing
a resource dynamic allocation program causing a computer to execute processing comprising:
acquiring a multithreaded application process initialized at a time of activation, a thread which is included in the multithreaded application process and to which a possible physical resource on a physical server is allocated, and allocation information of the physical resource allocated to the thread; and
freezing all threads of the initialized multithreaded application process and freezing the thread or unfreezing the thread in accordance with any one of transfer traffic, a resource load, and a load of the multithreaded application process.

7. A resource dynamic allocation system comprising:
a resource dynamic allocation device that dynamically allocates a resource; and
a controller that determines scale-in and scale-out of the resource, wherein
the resource dynamic allocation device includes a processor and a memory storing instructions that, when executed by the processor, cause the resource dynamic allocation device to perform operations of:
a thread ID acquisitor that acquires a multithreaded application process initialized at a time of activation, a thread which is included in the multithreaded application process and to which a possible physical resource on a physical server is allocated, and allocation information of the physical resource allocated to the thread, and
a resource recorder/allocator that freezes all threads of the initialized multithreaded application process and freezes the thread or unfreezes the thread in accordance with any one of transfer traffic, a resource load, and a load of the multithreaded application process.

8. A resource dynamic allocation method executed by a resource dynamic allocation device comprising a processor and a memory, the method comprising:
acquiring a multithreaded application process initialized at a time of activation, a thread which is included in the multithreaded application process and to which a possible physical resource on a physical server is allocated, and allocation information of the physical resource allocated to the thread; and freezing all threads of the initialized multithreaded application process and freezing the thread or unfreezing the thread in accordance with any one of transfer traffic, a resource load, and a load of the multithreaded application process.

9. The resource dynamic allocation device according to claim 1, wherein the resource recorder/allocator freezes all threads of the initialized multithreaded application process.

* * * * *